United States Patent
Lamb et al.

[19]

[11] Patent Number: 6,034,686
[45] Date of Patent: Mar. 7, 2000

[54] COLLAPSING EVENT DISPLAY FOR SMALL SCREEN COMPUTER

[75] Inventors: Arthur C. Lamb, Tiburon; Rob Haitani, San Jose, both of Calif.

[73] Assignee: 3Com Corporation, Santa Clara, Calif.

[21] Appl. No.: 09/037,157

[22] Filed: Mar. 9, 1998

[51] Int. Cl.[7] .................................................. G06F 17/30
[52] U.S. Cl. ........................ 345/348; 707/500; 707/102
[58] Field of Search ........................... 345/388; 707/500, 707/102

[56] References Cited

U.S. PATENT DOCUMENTS

| | | | |
|---|---|---|---|
| 4,432,057 | 2/1984 | Daniell et al. | 364/300 |
| 4,807,182 | 2/1989 | Queen | 364/900 |
| 4,866,611 | 9/1989 | Cree et al. | 364/300 |
| 4,875,159 | 10/1989 | Cary et al. | 364/200 |
| 4,956,809 | 9/1990 | George et al. | 364/900 |
| 4,977,520 | 12/1990 | McGaughey, III et al. | 345/330 |
| 5,001,628 | 3/1991 | Johnson et al. | 364/200 |
| 5,065,360 | 11/1991 | Kelly | 395/800 |
| 5,124,909 | 6/1992 | Blakely et al. | 395/200 |
| 5,129,057 | 7/1992 | Strope et al. | 345/348 |
| 5,142,619 | 8/1992 | Webster, III | 395/157 |
| 5,159,592 | 10/1992 | Perkins | 370/85.7 |
| 5,187,787 | 2/1993 | Skeen et al. | 395/600 |
| 5,210,868 | 5/1993 | Shimada et al. | 395/600 |
| 5,237,678 | 8/1993 | Kuechler et al. | 395/600 |
| 5,251,291 | 10/1993 | Malcolm | 395/146 |
| 5,261,045 | 11/1993 | Scully et al. | 345/329 |
| 5,261,094 | 11/1993 | Everson et al. | 395/600 |
| 5,272,628 | 12/1993 | Koss | 364/419.19 |
| 5,283,887 | 2/1994 | Zachery | 395/500 |
| 5,301,313 | 4/1994 | Terada et al. | 395/600 |
| 5,315,709 | 5/1994 | Alston, Jr. et al. | 395/600 |
| 5,327,555 | 7/1994 | Anderson | 395/600 |
| 5,333,252 | 7/1994 | Brewer, III et al. | 395/148 |
| 5,339,392 | 8/1994 | Risberg et al. | 395/161 |
| 5,339,434 | 8/1994 | Rusis | 395/700 |
| 5,355,476 | 10/1994 | Fukumura | 395/600 |
| 5,379,057 | 1/1995 | Clough et al. | 345/173 |
| 5,392,390 | 2/1995 | Crozier | 395/161 |

(List continued on next page.)

OTHER PUBLICATIONS

"Newton MessagePad Handbook", 030–2583–A, Apple Computer, Inc., Cupertino, CA, (1993), pp. 1–39.

"PalmTop PTC–300/310" User's guide, Sony Corp., (1991), pp. 140–153.

"Microsoft Windows for Pen Computing 1.0" User's Guide, Microsoft Corporation (1992), pp. 1–43.

"Connectivity Pack for the HP 95LX" User's Guide, Hewlett Packard Co., (1991), pp. 1–1 to 6–5.

Droms, R., "Dynamic Host Configuration Protocol", Request for Comments #1541, Oct. 1993, 24 pages.

(List continued on next page.)

*Primary Examiner*—Wayne Amsbury
*Attorney, Agent, or Firm*—Wilson, Sonsini, Goodrich & Rosati

[57] ABSTRACT

The present invention provides an ability to generate a different layout on the screen of a calendering program. The program generates customized time slots according to the start and end points of the appointments of the day. In addition to time slots covering appointments, empty time slots will be generated but will not appear on the screen if they overlap with an existing appointment. The elimination of unnecessary images for empty time slots which are in between appointments allows for a more efficient use of space on the display screen. In compressed view mode, empty one-hour time slots will be generated to the extent necessary to fill up the screen. If in non-compressed view mode, empty time slots of one-hour duration will be added to the layout from the beginning to the end of the day.

38 Claims, 3 Drawing Sheets

U.S. PATENT DOCUMENTS

| | | | |
|---|---|---|---|
| 5,434,994 | 7/1995 | Shaheen et al. | 395/500 |
| 5,463,772 | 10/1995 | Thompson et al. | 395/600 |
| 5,475,833 | 12/1995 | Dauerer et al. | 395/600 |
| 5,519,606 | 5/1996 | Frid-Nielson et al. | 364/401 |
| 5,523,775 | 6/1996 | Capps | 345/179 |
| 5,537,592 | 7/1996 | King et al. | 395/600 |
| 5,544,356 | 8/1996 | Robinson et al. | 395/600 |
| 5,546,539 | 8/1996 | Poling | 395/200.05 |
| 5,570,109 | 10/1996 | Jenson | 345/146 |
| 5,572,528 | 11/1996 | Shuen | 370/85.13 |
| 5,574,859 | 11/1996 | Yeh | 395/200.01 |
| 5,592,669 | 1/1997 | Robinson et al. | 395/622 |
| 5,598,536 | 1/1997 | Slaughter, III et al. | 395/200.16 |
| 5,602,997 | 2/1997 | Carpenter et al. | 395/349 |
| 5,644,628 | 7/1997 | Schwarzer et al. | 379/93.19 |
| 5,647,002 | 7/1997 | Brunson | 380/49 |
| 5,649,195 | 7/1997 | Scott et al. | 395/617 |
| 5,666,139 | 9/1997 | Thielens et al. | 345/173 |
| 5,666,362 | 9/1997 | Chen et al. | 370/420 |
| 5,666,438 | 9/1997 | Beernink et al. | 382/189 |
| 5,666,502 | 9/1997 | Capps | 345/352 |
| 5,666,530 | 9/1997 | Clark et al. | 395/617 |
| 5,684,990 | 11/1997 | Boothby | 395/619 |
| 5,696,702 | 12/1997 | Skinner et al. | 364/551.01 |
| 5,706,509 | 1/1998 | Man-Hak Tso | 395/617 |
| 5,710,922 | 1/1998 | Alley et al. | 395/617 |
| 5,724,510 | 3/1998 | Arndt et al. | 395/200.5 |
| 5,727,159 | 3/1998 | Kikinis | 395/200.76 |
| 5,727,202 | 3/1998 | Kucala | 395/610 |
| 5,729,452 | 3/1998 | Smith et al. | 364/424.03 |
| 5,742,820 | 4/1998 | Perlman et al. | 395/617 |
| 5,745,699 | 4/1998 | Lynn et al. | 395/200.75 |
| 5,758,354 | 5/1998 | Huang et al. | 707/201 |
| 5,761,439 | 6/1998 | Kar et al. | 395/200.78 |
| 5,812,819 | 9/1998 | Rodwin et al. | 395/500 |
| 5,873,094 | 2/1999 | Talatik | 707/104 |

OTHER PUBLICATIONS

Madnick, S. et al., "Logical Connectivity: Applications, Requirements, Architecture, and Research Agenda", IEEE (1991), pp. 142–153.

"IntelliLink" The Intelligent Link, Microsoft Windows 3 Personal Information Managers, IntelliLink, Inc., (1990).

Cobb, D. et al., "Paradox 3.5 Handbook" Third Edition, Borland Bantam, New York, Oct. 1991, pp. 803–816.

Alfieri, V., "The Best Book of: WordPerfect Version 5.0", Hayden Books, Indianapolis, IN (1988), pp. 151–165.

"PC–Link Release 2 for the Casio B.O.S.S. Business Organizer Scheduling System", Travelling Software, Inc., (1989), pp. 1–60.

"Casio 7–7000 Personal Digital Assistant User's Guide", Palm Computing, Inc., pp. 25–33, published prior to Mar. 9, 1998.

"PN–10 Xtend", User's Guide, pp. 34–73, published prior to Mar. 9, 1998.

"Zaurus PI–3000", Sharp Corp., pp. 288–289, published prior to Mar. 9, 1998.

"Redline, Strikeout, and Document Comparison", pp. 429–435, published prior to Mar. 9, 1998.

"LapLink for Windows SpeedSync", printed from Traveling Software, Inc. website, published prior to Mar. 9, 1998.

"Introducing Windows 95"Microsoft Windows 95 –For the Microsoft Windows Operating System, Microsoft Corporation, (1995), p. 66.

Zahn, L. et al., "Network Computing Architecture", Prentice Hall, New Jersey, pp. 1–209, published prior to Mar. 9, 1998.

"I/O Applications Note" Serial Communications Using the HP 95LX, Hewlett Packard, pp. 1–12, published prior to Mar. 9, 1998.

"Open Network Computing Technical Overview", Sun Microsystems, Inc., pp. 1–32, published prior to Mar. 9, 1998.

"Sharp Organizer Link II, Model OZ–890" Operation Manual, pp. 1–105, published prior to Mar. 9, 1998.

COLLAPSING EVENT DISPLAY FOR SMALL SCREEN COMPUTER

BACKGROUND OF THE INVENTION

1. Field of the Invention

The present invention relates to calender applications for small screen computers, such as hand held computers, and more particularly to techniques for efficient use of the small screen for such applications.

2. Description of Related Art

Small screen, hand held computers are gaining popularity, particularly for use as calendering tools. Hand held computers typically include an application program for scheduling and keeping track of appointments and other calendering functions. One popular hand held computer, sold under the trademark PalmPilot, by 3Com Corporation, includes a calendering program known as "Date Book".

The small screen on such computers presents a problem for calendering programs, because it is often impossible to display an entire day's appointments at one time in a size that allows reading of text associated with the appointments. This problem of display size is amplified for hand held computers which utilize touch screens over the display for input. In computers using touch screens, each entry on the display maps to an object on the touch screen corresponding to the entry, and therefore the size of each entry must be sufficient for the touch screen to distinguish touches of one entry from another.

The typical prior art device uses display paging to provide sufficient size for each entry. That is, as the display for a given day exceeds the available room on the screen, the computer divides the day into pages, and displays one page at a time. While this paging approach is useful, and provides for effective calendering, it removes useful information about a single day's appointments from the screen, and makes use of the calendering program less efficient.

Accordingly, it is desirable to provide a technique supporting more efficient use of the display screen on small screen computers, particularly for applications using lists of timed items, like calendering programs having lists of appointments during a day.

SUMMARY OF THE INVENTION

The present invention provides an ability to generate a different layout on the screen of a calendering program according to the appointments of the day. Instead of the mechanical one-hour time slots generated for each day, the program generates customized time slots according to the start and end points of the appointments of the day.

In addition to time slots covering appointments, empty time slots will be generated but will not appear on the screen if they overlap with an existing appointment. The elimination of unnecessary images for empty time slots which are in between appointments allows for a more efficient use of space on the display screen.

One embodiment of the invention includes a compressed mode, and a non-compressed mode. If in compressed view mode, empty one-hour time slots will be generated, starting with the time designated as "start of day," to the extent necessary to fill up the screen. Paging of the display is used in the compressed mode when actual appointments require it, but not for the purpose of inserting empty time slots on the screen for the day. If in non-compressed view mode, empty time slots of one-hour duration will be added to the layout between the time designated as "start of day" and the time designated as "end of day," and a scroll icon will appear at the bottom of the page to indicate a next page of display, if the total number of time slots generated exceeds what can be displayed in one page.

The invention can be characterized in one embodiment as a method for rendering a display of a list in a display field, wherein items in the list have a start time, an end time and associated data, such as appointment entries for a calendering program. The display for the list is rendered depending on the contents of the list.

If the list is empty, empty slot images for a plurality of default times, such as on the hour, are drawn on the display beginning with a start of day time and ending with an end of day time in respective positions in the display field. The empty slot images comprise in one example text indicating a time for the slot, and a horizontal line suggesting a space for inserting text to create an appointment.

If the list is not empty, the program according to this aspect of the invention processes each item in the list according to an order, such as chronologically or reverse chronologically, as follows:

if the end time of the item is earlier than the start time of a next item according to the order, then insert at an available position in the display field a start slot image for the start time of the item followed by graphics, if any, identified by the associated data for the item, followed by an end slot image for the end time of the item if no end slot image for another item is found for the end time, if the end time of the item matches the start time of a next item according to the order, then insert at an available position in the display field a start slot image for the start time of the item followed by graphics identified by the associated data for the item, if the end time of the item is later than the start time of a next item according to the order, then insert at an available position in the display field a start slot image for the start time of the item followed by graphics, if any, identified by the associated data for the item, followed by an end slot image for the end time of the item if no end slot image for another item is found for the end time.

Empty slot images are inserted according to a compressed mode or a non-compressed mode as mentioned above. In the compressed mode, the start slot images, graphics indicated by associated data, end slot images and default slot images have respective heights, and empty slot images in the display field are inserted at default times includes, until the sum of the heights of the inserted start slot images, graphics indicated by associated data, end slot images and default slot images fills the display height, according the following rules:

inserting empty slot images for default times which occur after the end time of a first item in the list but do not occur between start times and end times for other items in the list, inserting empty slot images for default times between the start of day time and the start time of an item in the list with an earliest start time, and inserting empty slot images for default times after the end time of an item in the list having a latest end time until the first to occur of the end of day time and a condition in which a sum of the heights of the inserted start slot images, graphics indicated by associated data, end slot images and default slot images fills the display height.

If the sum of the heights of the inserted start slot images, graphics indicated by associated data, and end slot images fills the display height, then empty slot images are removed between the filled slots to make more room.

In the non-compressed mode, the empty slot images are managed simply by inserting empty slot images for default times between the start of day time and the start time of an item in the list with an earliest start time, and between a last end slot image and an end of day time.

The start slot images in one embodiment comprise text indicating a start time for a corresponding item in the list. In this embodiment the end slot images comprise text indicating a end time for a corresponding item in the list. The associated data for an item in the list comprises text in one example, and the graphics identified by the associated data include characters of the text.

According to another aspect, the invention further includes processes for assigning regions, such as rows, in the display field to the empty slot images, and in response to input indicating the assigned regions, such as touch screen input, displaying a tool, such as a dialogue box, for inserting an item in the list having a start time equal to the default time of the empty slot image. In this aspect, the invention also includes processing for assigning regions in the display field to the start slot images, and in response to input, such as touch screen input, indicating the assigned regions, displaying a tool for editing the item in the list corresponding to the start slot image of the assigned region.

According to another aspect of the invention, a hand held computer is provided with a display, a touch screen input device and processing resources for executing the processes outlined above.

Other aspects and advantages of the present invention can be seen on review of the drawings, the detailed description and the claims which follow.

DETAILED DESCRIPTION

Figure 1:
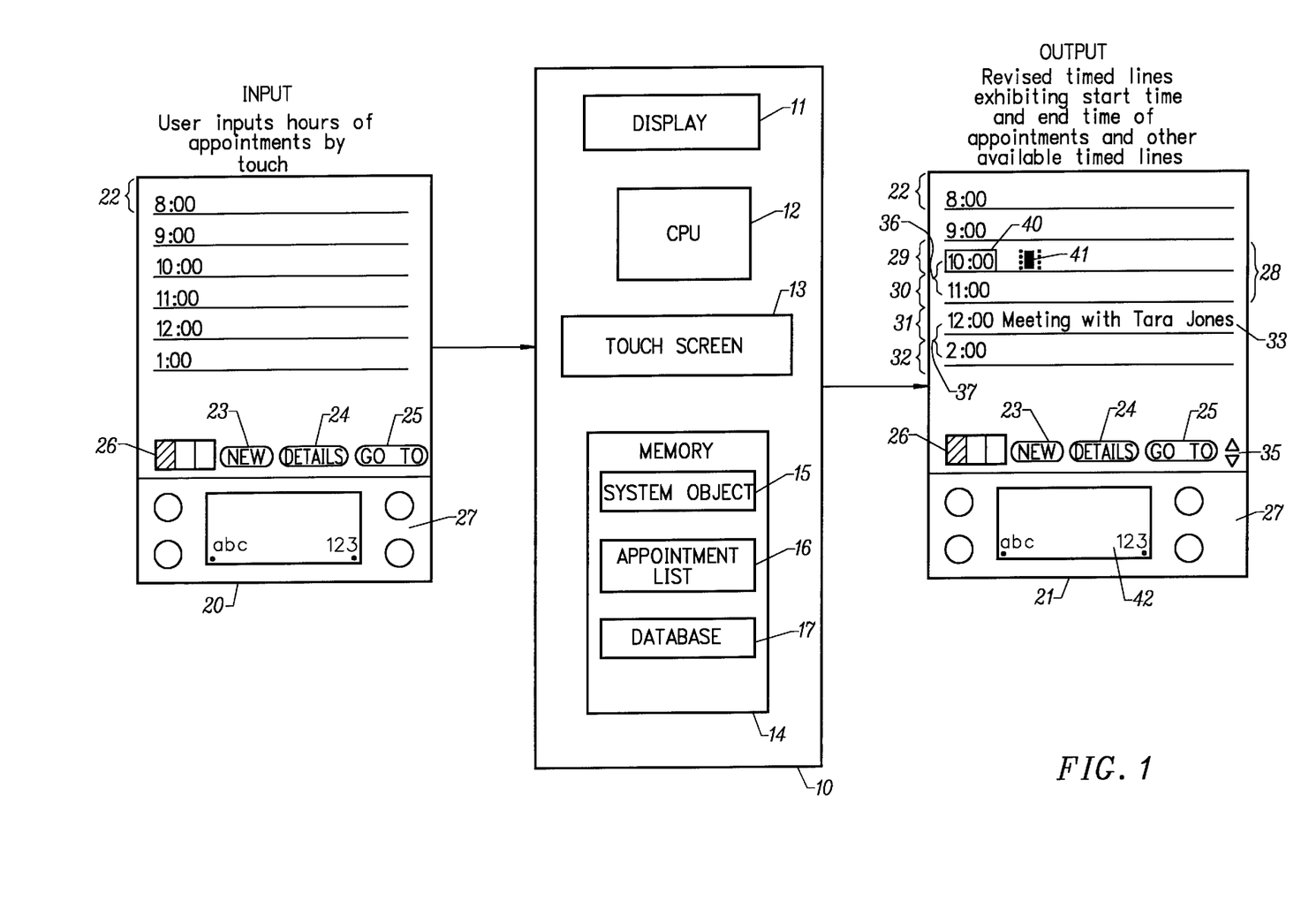
FIG. 1 is a schematic showing of data inflow and outflow, including typical display screen, of a calendering program for a hand held computer having a touch screen input.

A detailed description of examples of the present invention is provided with reference to the figures, in which FIG. 1 illustrates an exemplary embodiment of the input and output of data on a calendering component of a hand held computer system 10. The computer system 10 includes a small display 11, a central processing unit 12, a touch screen 13 which overlays the display 11, and memory 14. Other processing resources known in the art are included on the system. The block diagram in FIG. 1 is intended to represent any one of a variety of small screen computers such as the hand held computer sold under the trademark PalmPilot by 3Com Corporation of Santa Clara, Calif. The computer system 10 includes data processing resources for executing a calendering program. One such calandaring program is known as the Date Book program provided with the PalmPilot (trademark) computer system mentioned above.

The memory 14 according to a preferred embodiment of the invention includes a system object data structure 15, an appointment list data structure 16, and a database 17. The structure of these components is described in more detail with reference to FIG. 2.

FIG. 1 illustrates a first rendering 20 of the display 11, for an empty appointment list, and a second rendering 21 of the display 11 for an appointment list which includes appointment entries. The display rendering 20 shows a sequence of empty slot images such as the image 22 which includes text indicating a time of day such as 8:00 am, and a line suggesting an empty region to which text can be added to create a new appointment entry. Also the rendering 20 includes function buttons, such as the "new" button 23, the "details" button 24, and the "go to" button 25. These buttons are touched, and the touch is detected by the touch screen 13 to cause display of tools used by the calendering program. For example, the "new" button 23 designates an entry point by which a tool for inserting a new appointment is brought up to the screen. The rendering 20 also includes a display mode selector icon 26. This icon includes a field for displaying a single day in the calender, a field for displaying a week in the calender, and a field for displaying a month in the calender. The present invention relates particularly to the single day display mode, in which the time slots between a start of day time, such as 8:00 am and an end of day time, such as 6:00 pm are displayed, if room is available according to the algorithms of the present invention.

The lower region 27 on the rendering 20 represents an input field on the PalmPilot (trademark) computer, which is incidental to the present invention. Thus, the rendering 20 illustrates a rendering of the screen before the user has input appointments using the touch screen. The rendering 21 includes the components of the rendering 20, including the empty slot image 22, but also includes revised time lines exhibiting start time and end time of appointments, and some available empty time lines. Thus, a first appointment entry is represented by the region 28. It includes a start slot image 29 which includes text indicating a starting time, in this example 10:00, and a horizontal line suggesting a place to enter text. There is no text associated with this start slot entry. There is also an end slot entry 30 including a text indicating the ending time of the appointment, and a blank line. A second appointment entry is also shown in the rendering 21 including a start slot entry 31, and an end slot entry 32. Text 33 is also displayed in association with the start slot entry 31. When more than one line is necessary for the text associated with a given appointment, multiple lines are consumed on the display.

The rendering 21 also includes a paging icon 35 by which the user is able to pull-up display of a second page of the appointment day, or return to a first page as necessary.

Also shown on the rendering 21 are time bars 36 and 37. The time bars connect a start slot image, such as image 29 and an end slot image, such as image 30. The time bar display is optional and provides additional feedback to the user concerning the characteristics of the appointments on the display.

The rendering 21 in FIG. 1 also illustrates the tool displayed for adding a new appointment or editing an existing appointment which is displayed upon sensing of a touch of a time slot. Thus for example, the appointment beginning at time 10:00 am on the rendering 21 includes a curser 41, and a highlight 40 of the start time 10:00. In the figure, the highlight is in the form of a box around the time. In a preferred embodiment, the highlight is in the form of a reverse coloring for the box around the time. The curser 41 is used in combination with the touch pad region 42 for inserting a new entry in the list, for an empty time slot, and editing an existing entry in the list for a existing time slot existing entry. Thus, if the touch screen detects input on an image of an empty time slot, then the tool is used for creating a new entry in the list. If the touch screen detects an input indicating a time slot for an existing entry in the list, then the tool is used for editing the entry in the list.

It can be appreciated that it is possible to include multiple appointments in a single day, appointments with overlapping times, and appointments with large associated graphics, such as text which can rapidly consume the small screen on the hand held computer.

In a preferred embodiment of the present invention, the display is rendered in a way that conserves space, while displaying as much information about actual appointments as possible. The algorithm works by first creating a list of untimed appointments and timed appointments in the appointment list structure 16 for the current day sorted by time of day. Untimed appointments are handled as suits the needs of a particular implementation. For example, untimed appointments can be displayed at the beginning of the day with the graphic indicating that the appointments are untimed.

If there are no appointments on the current day, the appointment list is filled in with empty time slots, starting with a start of day hour set by a user, and ending at an end of day hour also set by a user. An empty time slot is created for each hour, or at other default times as suits a particular implementation. In this case, the layout of the day is complete and the display is rendered.

For a system in which timed appointments have been entered in the list, the process basically proceeds by determining whether the end time of a given appointment overlaps with another appointment. If it does not overlap, a blank time slot is added after the appointment. The start time of the new blank appointment is assigned to be the end time of the timed appointment. The end time of the new blank appointment is the earlier of the start time of the next timed appointment, or the start time of the next hour or other default time slot. If more than one timed appointments have the same end time, only one blank time slot for all of these appointments is added as the end slot image.

If the end time of a given appointment overlaps with another appointment, the start time of the next appointment is entered, followed by the end time of the previous appointment and the end time of the following appointment, in chronological order.

The application according to a preferred embodiment has a compressed mode and a non-compressed mode. In the compressed mode, a blank empty slot image is inserted at each default time between the start of day and end of day, if the time does not overlap an existing appointment. The end time of a blank appointment represented by an empty slot image is the earlier of the next appointment or the start time of the next hour and the layout is complete. Next the algorithm determines whether there is enough space to add empty time slots. These time slots are inserted in addition to the empty time slots that represent the end times of the events, if space is available in the vertical display height of the display field, after the space consumed by the actual appointments, including the start slot images and the associated graphics, and the end slot images. Starting at the start of day, a blank appointment is added at the start of each hour or other default time, if the time does not overlap an existing appointment. Empty slot images are not inserted when the available space is filled in, or when the end of the day is reached. In the non-compressed mode, empty slot images are inserted for every empty slot between the start of day and the end of day. The screen is paged as necessary to provide coverage for the entire range of times in the day. In the compressed view mode, paging of the display is used only when actually filled in appointments require extra space provided by paging.

Figure 2:
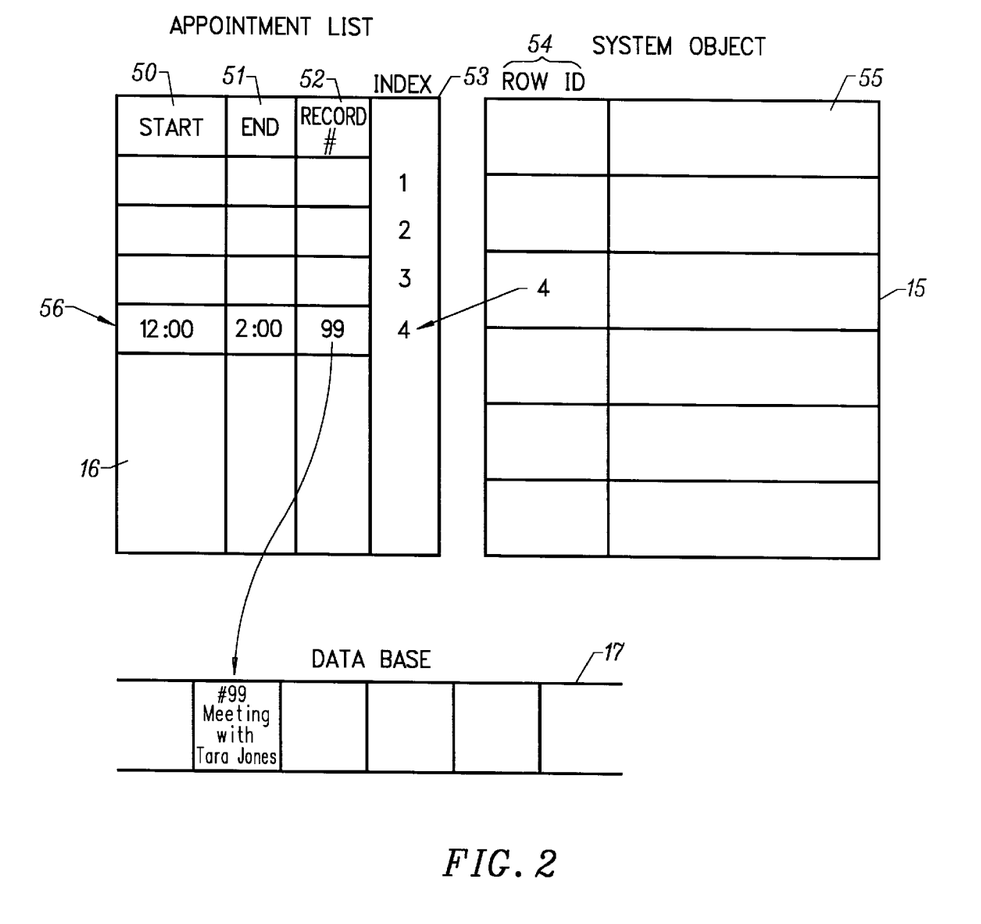
FIG. 2 is a schematic of the linkages between the touch screen system object which receives the input, the input data structure (Appointment List) and database for associated data.

The system object 15 refers to a mapping from the touch screen 13 to the display in the appointment list 16. The database 17 provides a place for storing data associated with each appointment in the list 16. FIG. 2 illustrates in more detail the linkages between the system object 15, the appointment list 16, and the database 17. In this embodiment the appointment list includes a plurality of entries. Each entry includes a start time in column 50, an end time in column 51, and a record number in column 52. Further, each entry is indexed to a row identifier in the system object in column 53. The system object 15 includes a set of row identifiers, corresponding to each graphic on the display for which input can be detected. Thus, the system object 15 includes a row identifier in column 54, as well as other identifying data for the object in the region 55. For example, the range of columns within which the object falls can also be stored in the system object table 15. In this embodiment, the row identifier is used as an index into the appointment list. Any input sensed by the touch screen for the row identifier 4 is thus mapped to the appointment list at index 4 as indicated in the figure.

The record identifier in column 52 in the appointment list 16 is used as an index into a database 17 for storing data associated with the item in the list. Thus, the item 56 in the list includes a start time of 12:00, an end time of 2:00, a record identifier 99, and an index of 4. The record identifier 99 points to entry 99 in the database 17. Data associated with the item in the list 56 includes text reading "meeting with Tara Jones". This text is displayed on the appointment view as indicated by rendering 21 of FIG. 1.

The organization of data illustrated in FIG. 2 is one example organization. A wide variety of indexing and data structures could be utilized to accomplish these functions as known in the art.

Figure 3:
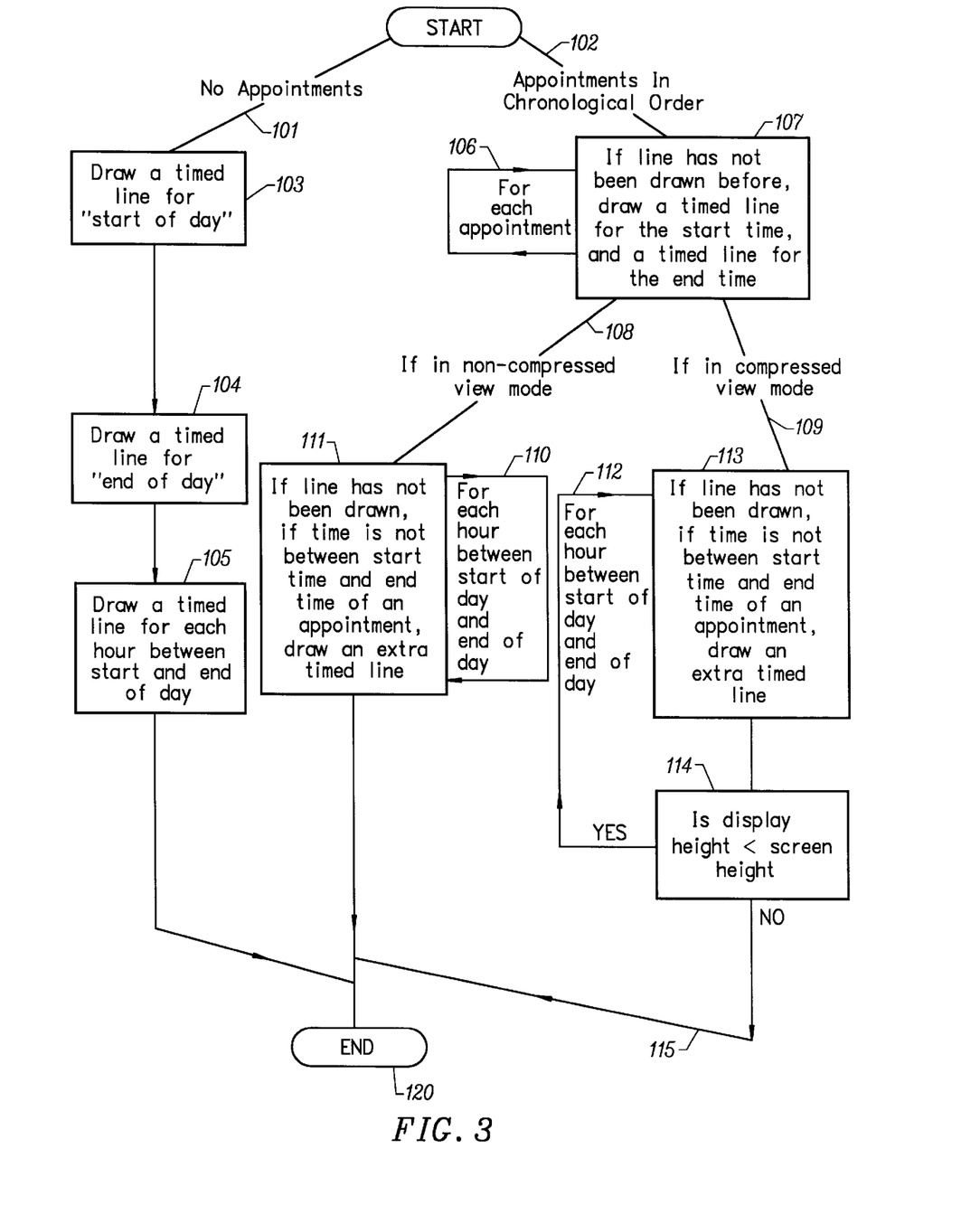
FIG. 3 is a flowchart showing the process of building the display layout according to the present invention.

FIG. 3 is the flow chart of a process for building a display after the system receives user input, starting a block 100. In the case of no appointments, the system simply fills the screen with one-hour time slots between the "start of day" and the "end of day." Following link 101 to the algorithm for no appointments, the system draws an empty slot image for the hour designated as "start of day" (box 103). It then draws an empty slot image for the hour designated as "end of day" (box 104). Finally the system draws an empty slot image for each hour between the start and the end of day. The layout is then complete and the system moves to box 120, the end.

If there are appointments, the system follows link 102 to the algorithm for combining appointments with extra time slots. For each appointment, the system draws a start slot image for the start of the appointment, followed by text or other graphics indicated by data associated with the appointment, and an end slot image for the end of the appointment, provided an end slot image or a start slot image for the same time has not been drawn for another appointment (box 107). The system follows link 106 to repeat the process in box 107 for each appointment. In this example, the empty slot image, stunt slot image and end slot image are essentially the same, except that text is associated with teh start slot image.

For adding extra time slots, the system follows link 108 to the algorithm in box 111 in non-compressed view mode. Checking first to be sure no image has not been drawn for the hour, and that the time is not between the start time and end time of an existing appointment, the system draws an empty slot image for the hour designated "start of day." Following link 110, the system repeats this process for each hour following the "start of day" until it draws an empty slot image for the "end of day." The layout is then complete and the system moves to box 120, the end.

In the compressed view mode, the system will follow link 109 to box 113 for a different algorithm to generate only enough empty time slots to fill the screen. Checking to be sure that an image for the time has not been drawn before, and that the time is not between the start time and the end time of an appointment, the system will draw an empty slot image for the hour designated "start of day." The system then checks to see if the display height is smaller than the screen height (box 114). If the answer is yes, the system follows link 112 to repeat this process for the next hour. If the answer is no, the screen is full and the system follows link 115 to box 120, the end.

The rendering 21 of FIG. 1 is an illustration of a screen display in compressed view mode after entries for two appointments, first from 10:00 to 11:00 and second from 12:00 to 2:00, have been made. Note that no extra timed line for 1:00 will appear on the display screen because 1:00 is between the start time and end time of the second appointment.

If the list is not empty, therefore, the program processes each item in the list according to an order, as follows:
  if the end time of the item is earlier than the start time of a next item according to the order, then insert at an available position in the display field a start slot image for the start time of the item followed by graphics, if any, identified by the associated data for the item, followed by an end
slot image for the end time of the item if no end slot image for another item is found for the end time,
  if the end time of the item matches the start time of a next item according to the order, then insert at an available position in the display field a start slot image for the start time of the item followed by graphics identified by the associated data for the item,
  if the end time of the item is later than the start time of a next item according to the order, then insert at an available position in the display field a start slot image for the start time of the item followed by graphics, if any, identified by the associated data for the item, followed by an end slot image for the end time of the item if no end slot image for another item is found for the end time, and
  insert empty slot images at default times for which no end time or start time occurs in the list, and to the extent additional room is available on the display for the compressed mode.

The elimination of unnecessary timed lines in the form of empty slot images which are in between appointments, and lines within the range of longer appointments, allows for a more efficient use of space on the display screen.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A method for rendering a display of a list in a display field, wherein items in the list have a start time, an end time and associated data, comprising:
  if the list is empty, draw empty slot images for a plurality of default times, beginning with a start of day time and ending with an end of day time in respective positions in the display field;
  if the list is not empty, process each item in the list according to an order,
    if the end time of the item is earlier than the start time of a next item according to the order, then insert at an available position in the display field a start slot image for the start time of the item followed by graphics, if any, identified by the associated data for the item, followed by an end slot image for the end time of the item if no end slot image for another item is found for the end time,
    if the end time of the item matches the start time of a next item according to the order, then insert at an available position in the display field a start slot image for the start time of the item followed by graphics identified by the associated data for the item,
    if the end time of the item is later than the start time of a next item according to the order, then insert at an available position in the display field a start slot image for the start time of the item followed by graphics, if any, identified by the associated data for the item, followed by an end slot image for the end time of the item if no end slot image for another item is found for the end time, and
    insert empty slot images at default times for which no end time or start time occurs in the list.

2. The method of claim 1, wherein the empty slot images comprise text indicating respective default times in the plurality of default times.

3. The method of claim 1, wherein the start slot images comprise text indicating a start time for a corresponding item in the list.

4. The method of claim 1, wherein the end slot images comprise text indicating a end time for a corresponding item in the list.

5. The method of claim 1, wherein the associated data for at least on item in the list comprises text, and the graphics identified by the associated data include characters of the text.

6. The method of claim 1, wherein the default times include hours between the start of day time and the end of day time.

7. The method of claim 1, including assigning regions in the display field to the empty slot images, and in response to input indicating the assigned regions, displaying a tool for inserting an item in the list having a start time equal to the default time of the empty slot image.

8. The method of claim 1, including assigning regions in the display field to the start slot images, and in response to input indicating the assigned regions, displaying a tool for editing the item in the list corresponding to the start slot image of the assigned region.

9. The method of claim 1, wherein the step of inserting empty slot images at default times includes inserting empty slot images for default times which occur after the end time of a first item in the list but do not occur between start times and end times for other items in the list.

10. The method of claim 9, wherein the step of inserting empty slot images at default times includes inserting empty slot images for default times between the start of day time and the start time of an item in the list with an earliest start time, and between a last end slot image and an end of day time.

11. The method of claim 1, wherein the display has a display height, and the start slot images, graphics indicated by associated data, end slot images and default slot images have respective heights, and the step of inserting empty slot images in the display field at default times includes inserting empty slot images for default times which occur after the end time of a first item in the list but do not occur between start times and end times for other items in the list, inserting empty slot images for default times between the start of day time and the start time of an item in the list with an earliest start time, and inserting empty slot images for default times after the end time of an item in the list having a latest end time until the first to occur of the end of day time and a condition in which a sum of the heights of the inserted start slot images, graphics indicated by associated data, end slot images and default slot images fills the display height.

12. The method of claim 1, wherein the order proceeds chronologically from the start of day to the end of day.

13. The method of claim 1, wherein the order proceeds reverse chronologically from the end of day to the start of day.

14. The method of claim 1, wherein the display field comprises a plurality of rows, and including positioning the start slot images, graphics indicated by associated data, end slot images and default slot images respectively in one or more rows in the plurality of rows.

15. The method of claim 14, including in response to input indicating the one or more rows of an empty slot image, displaying a tool for inserting an item in the list having a start time equal to the default time of the empty slot image.

16. The method of claim 14, including in response to input indicating the one or more rows of a start slot image, displaying a tool for editing the item in the list corresponding to the start slot image.

17. For a device including a touch screen input for indicating a position on a display, a method for rendering the display of a list in a display field including a plurality of display regions, wherein items in the list have a start time, an end time and associated data, comprising:

if the list is empty, draw empty slot images for a plurality of default times, beginning with a start of day time and ending with an end of day time in respective positions in the display field;

if the list is not empty, process each item in the list according to an order, if the end time of the item is earlier than the start time of a next item according to the order, then insert a start slot image for the start time of the item followed by graphics, if any, identified by the associated data for the item, followed by an end slot image for the end time of the item if no end slot image for another item is found for the end time, at respective display regions in the display field, if the end time of the item matches the start time of a next item according to the order, then insert a start slot image for the start time of the item followed by graphics identified by the associated data for the item, at respective display regions in the display field, if the end time of the item is later than the start time of a next item according to the order, then insert a start slot image for the start time of the item followed by graphics, if any, identified by the associated data for the item, followed by an end slot image for the end time of the item if no end slot image for another item is found for the end time, at respective display regions in the display field, and insert empty slot images at default times for which no end time or start time occurs in the list at respective display regions in the display field; and in response to input indicating the display region of a start slot image, displaying a tool for editing the item in the list corresponding to the start slot image of the indicated display region; and in response to input indicating the display regions of end slot images, displaying a tool for inserting an item in the list having a start time equal to the default time of the empty slot image of the indicated display region.

18. The method of claim 17, wherein the empty slot images comprise text indicating respective default times in the plurality of default times.

19. The method of claim 17, wherein the start slot images comprise text indicating a start time for a corresponding item in the list.

20. The method of claim 17, wherein the end slot images comprise text indicating a end time for a corresponding item in the list.

21. The method of claim 17, wherein the associated data for at least on item in the list comprises text, and the graphics identified by the associated data include characters of the text.

22. The method of claim 17, wherein the default times include hours between the start of day time and the end of day time.

23. The method of claim 17, wherein the step of inserting empty slot images at default times includes inserting empty slot images for default times which occur after the end time of a first item in the list but do not occur between start times and end times for other items in the list.

24. The method of claim 23, wherein the step of inserting empty slot images at default times includes inserting empty slot images for default times between the start of day time and the start time of an item in the list with an earliest start time, and between a last end slot image and an end of day time.

25. The method of claim 23, wherein the step of inserting empty slot images at default times includes inserting empty slot images for default times between the start of day time and the start time of an item in the list with an earliest start time, and between a last end slot image and an end of day time until the display regions of the display field are consumed.

26. The method of claim 17, wherein the order proceeds chronologically from the start of day to the end of day.

27. The method of claim 17, wherein the order proceeds reverse chronologically from the end of day to the start of day.

28. A hand held processor comprising:

a display having a display field including a plurality of display regions, a touch sensitive overlay on the display field for providing input indicating a position on the display field, and processing resources for managing display of a list in the display field, wherein items in the list have a start time, an end time and associated data, which if the list is empty, draw empty slot images for a plurality of default times, beginning with a start of day time and ending with an end of day time in respective positions in the display field;

if the list is not empty, process each item in the list according to an order, if the end time of the item is earlier than the start time of a next item according to the order, then insert a start slot image for the start time of the item followed by graphics, if any, identified by the associated data for the item, followed by an end slot image for the end time of the item if no end slot image for another item is found for the end time, at respective display regions in the display field, if the end time of the item matches the start time of a next item according to the order, then insert a start slot image for the start time of the item followed by graphics identified by the associated data for the item, at respective display regions in the display field, if the end time of the item is later than the start time of a next item according to the order, then insert a start slot image for the start time of the item followed by graphics, if any, identified by the associated data for the item, followed by an end slot image for the end time of the item if no end slot image for another item is found for the end time, at respective display regions in the display field, and insert empty slot images at default times for which no end time or start time occurs in the list at respective display regions in the display field; and in response to input indicating the display region of a start slot image, display a tool for editing the item in the list corresponding to the start slot image of the indicated display region; and in response to input indicating the display regions of end slot images, display a tool for inserting an item in the list having a start time equal to the default time of the empty slot image of the indicated display region.

29. The processor of claim 28, wherein the empty slot images comprise text indicating a default time.

30. The processor of claim 28, wherein the start slot images comprise text indicating a start time for a corresponding item in the list.

31. The processor of claim 28, wherein the end slot images comprise text indicating a end time for a corresponding item in the list.

32. The processor of claim 28, wherein the associated data for at least on item in the list comprises text, and the graphics identified by the associated data include characters of the text.

33. The processor of claim 28, wherein the default times include hours between the start of day time and the end of day time.

34. The processor of claim 28, wherein the step of inserting empty slot images at default times includes inserting empty slot images for default times which occur after the end time of a first item in the list but do not occur between start times and end times for other items in the list.

35. The processor of claim 34, wherein the step of inserting empty slot images at default times includes inserting empty slot images for default times between the start of day time and the start time of an item in the list with an earliest start time, and between a last end slot image and an end of day time.

36. The processor of claim 34, wherein the step of inserting empty slot images at default times includes inserting empty slot images for default times between the start of day time and the start time of an item in the list with an earliest start time, and between a last end slot image and an end of day time until the display regions of the display field are consumed.

37. The processor of claim 28, wherein the order proceeds chronologically from the start of day to the end of day.

38. The processor of claim 28, wherein the order proceeds reverse chronologically from the end of day to the start of day.

* * * * *